April 20, 1926.
P. WUNDERLICH ET AL
1,581,624
SYNCHRONIZED REGULATOR
Filed March 18, 1925   2 Sheets-Sheet 1
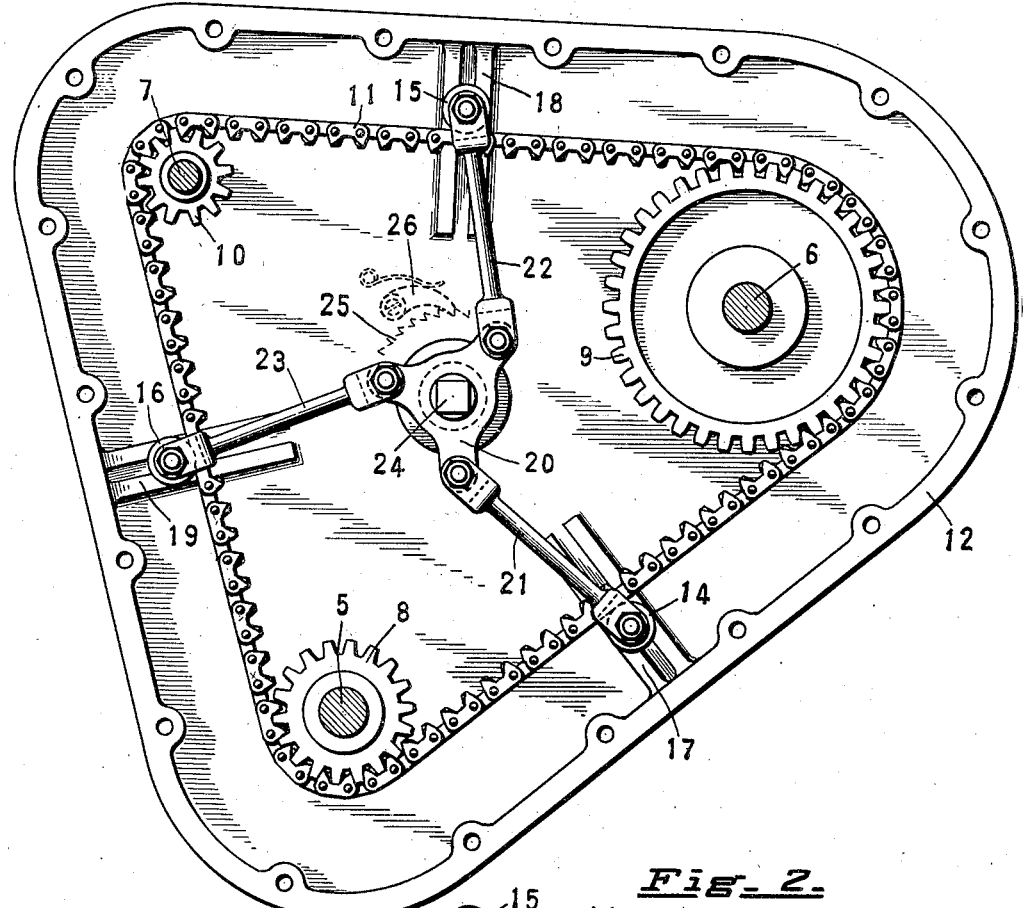
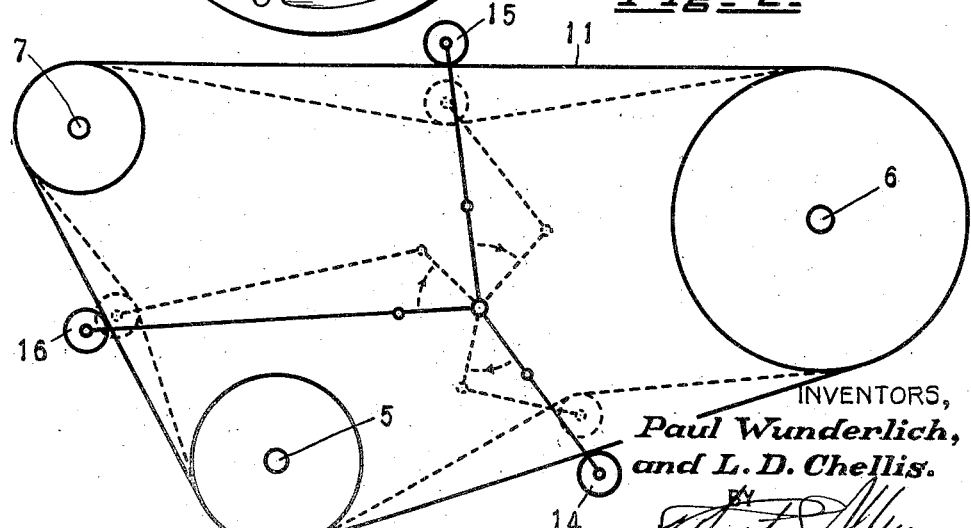
INVENTORS,
Paul Wunderlich,
and L. D. Chellis.

April 20, 1926.

P. WUNDERLICH ET AL 1,581,624

SYNCHRONIZED REGULATOR

Filed March 18, 1925

INVENTORS,
Paul Wunderlich,
and L. D. Chellis,
BY
ATTORNEY.

Patented Apr. 20, 1926.

1,581,624

UNITED STATES PATENT OFFICE.

PAUL WUNDERLICH, OF TARRYTOWN, AND LAWRENCE D. CHELLIS, OF NEW YORK, N. Y.

SYNCHRONIZED REGULATOR.

Application filed March 18, 1925. Serial No. 16,316.

*To all whom it may concern:*

Be it known that we, PAUL WUNDERLICH and LAWRENCE D. CHELLIS, citizens of the United States of America, residing at city of Tarrytown, county of Westchester, New York State, and county, city, and State of New York, respectively, have invented a new and useful Synchronized Regulator, of which the following is a specification.

It is customary in mechanical timing or synchronizing devices to connect two or more shafts by a drive chain or belt so that the motive power is transmitted from one shaft to another or more shafts.

In the automotive industry, for this type of drive, the chain or belt usually connects the drive, cam and generator shafts and operates these shafts.

This chain or belt when in use, tends to stretch and thereby change the angular or timing relation between these shafts.

The main object of our invention is to provide a simple and reliable means for keeping the chain or belt tight and thereby maintaining the above mentioned relations.

In the accompanying drawings we have shown one form of carrying out the invention applicable to the common automotive front end drive, together with diagrammatic views showing the invention as applied to various other arrangements of shafts.

Fig. 1 is a front view of an arrangement for connecting the crank shaft with a single cam shaft and a generator shaft.

Fig. 2 shows a diagram of the adjustments applicable to such an arrangement.

Figure 3:
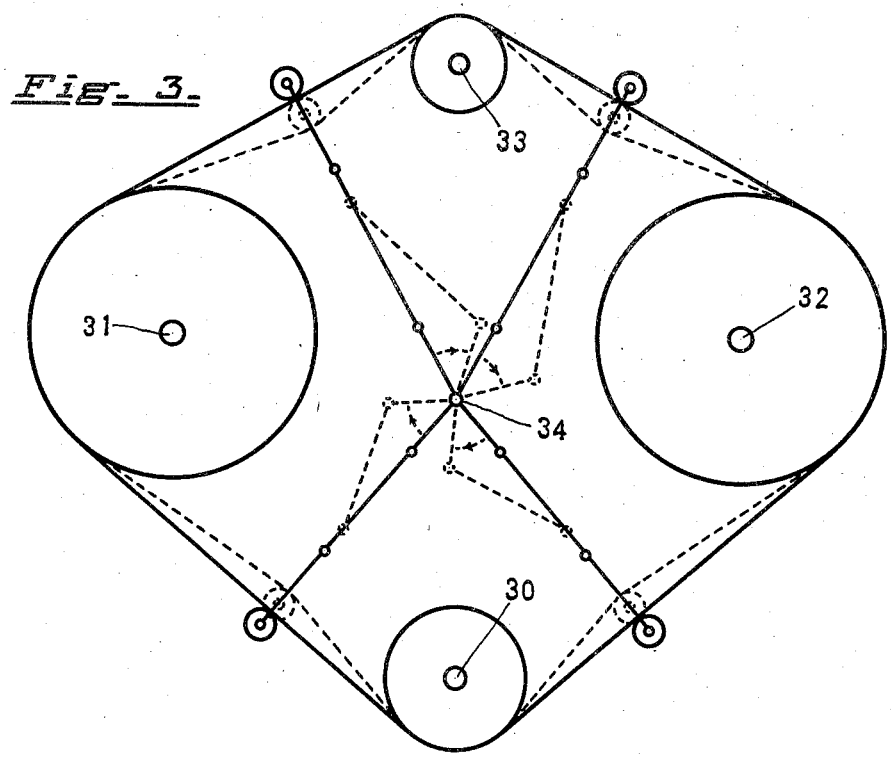
Fig. 3 is a diagram showing the invention as applied to an engine having two cam shafts and a generator shaft all connected by a single chain or belt.

In a typical arrangement shown in Fig. 1, the main engine or crank shaft 5, the valve cam shaft 6, and the generator shaft 7, have, respectively, sprockets 8, 9 and 10 connected by a chain 11. All of these shafts are suitably mounted in the frame of the machine, part of which 12 may be termed the support so that they have fixed positions with respect to each other.

The idlers or rollers 14, 15 and 16 are shown bearing against the outer portion of the chain 11 and are guided by the forked or track-like members 17, 18 and 19, respectively. Each of these rollers and each corresponding guide is located mid-way of its respective side of the chain. In a convenient position with respect to these shafts we locate a revoluble member 20 which is connected to the rollers by the rods 21, 22 and 23 respectively. The distance from the center of the member 20 to the center of the point of connection, may be considered as its crank arm, and these crank arms are proportioned respectively to the lengths of the sides of the chain to which they are connected. This relation is particularly important with respect to the two reaches of the chain which run around the cam shaft sprocket 9. It is of the utmost importance that the adjustment of the chain shall maintain the angular relation existing between the crank shaft and the cam shaft. The other length of chain between the generator shaft and the crank shaft is not so important and it is, therefore, not necessary to have this proportional relation existing on this side of the chain except in those cases where the ignition timer or distributor is driven from the generator shaft.

The means by which this member 20 is adjusted may be of any suitable form, for instance, of simply a squared shaft 24 for the attachment of a crank or wrench. In fact, this might be provided with a spring for automatically taking out the slack in the chain. Some suitable form of means should also be provided to hold the member 20 and the rollers in their proper positions, as, for instance, the ratchet 25 and spring-pressed pawl 26.

Fig. 2 shows, diagrammatically, a similar combination of shafts and drive connections by full lines. The dotted lines show the positions the parts would occupy when the chain stretches. The arrows indicate the angular adjustment of the cranks.

In Fig. 3 the main engine or crank shaft 30 is shown at the bottom and the two valve cam shafts 31 and 32 at the sides. In this case the generator shaft 33 is arranged above and the adjusting member 34 is arranged in the center and connected to the idlers so as to enable the chain to be adjustable without changing the timing.

Figure 4:
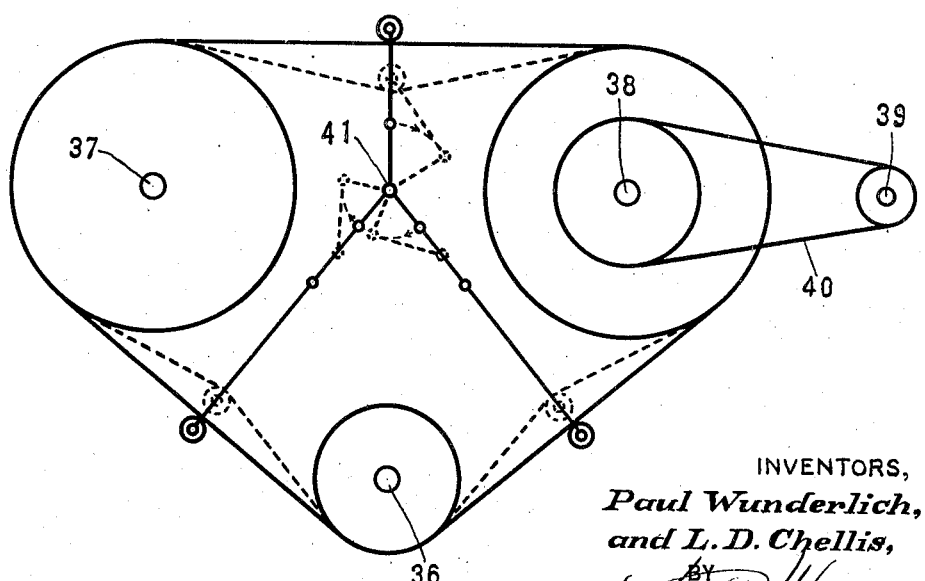
Fig. 4 is a diagram showing a typical drive for a T head motor or for a V type engine with double chain or belt drive and outside driven generator and pump shaft.

In Fig. 4 the engine shaft 36 is at the bottom and the two cam shafts 37 and 38 at the sides. The shaft 39 for the generator is connected to the shaft 38 by the chain or belt 40. In this, as before, the adjusting member 41 is located in a convenient position and connected between the elements whose timing relation must be maintained constant.

We claim:

1. A motor drive combination comprising, a main power shaft, a valve cam shaft, sprockets on said shafts, a drive chain connecting said sprockets, an idle roller engaging said chain on both sides of said valve cam shaft sprocket midway of the contacting reach of the chain and means for simultaneously and proportionally adjusting said rollers.

2. A synchronized drive combination consisting of a power shaft, a plurality of other shafts, a drive chain connecting said shafts, and means for simultaneously moving all the tension reaches of the chain proportionally to the length of the respective reaches.

3. A motor drive combination comprising a main power shaft, a valve cam shaft, a generator shaft, sprockets on said shafts, a drive chain connecting said sprockets, a pressure device engaging said chain between said power shaft and said valve cam shaft, a pressure device engaging said chain between said cam shaft and said generator shaft, and means for simultaneously and proportionally adjusting said pressure devices to take up the slack in the chain without changing the timing of the valve cam shaft.

4. A motor drive combination comprising a main power shaft, a number of other shafts, sprockets on said shafts, a chain connecting said sprockets, pressure devices coacting with said chain between each two adjacent sprockets, guides for said pressure devices extending at right angles to the exterior tangent planes of said sprockets and means for simultaneously adjusting all of said pressure devices and thereby adjusting the various reaches of the chain proportionally to their respective lengths.

5. A drive combination comprising a motor shaft, a number of other shafts substantially parallel thereto, sprockets on all of said shafts, a chain connecting said sprockets, a centrally disposed revoluble member between said sprockets, pressure rollers engaging the outer surfaces of said chain and links connecting said revoluble device with said rollers, said parts being located and proportioned so as to take up the slack in the reaches of the chain proportionally to their respective lengths.

6. A power drive combination comprising a motor shaft, a number of other shafts substantially parallel thereto, sprockets mounted on all of said shafts, a chain connecting said sprockets, pressure devices engaging the outer surfaces of said chain, guides for said pressure devices extending substantially perpendicular to the respective reaches of said chain, a revoluble member mounted between said shafts and links hinged to said revoluble member and connected to said pressure devices whereby the respective reaches of said chain may be simultaneously and proportionally tensioned.

PAUL WUNDERLICH.
L. D. CHELLIS.